Feb. 20, 1923.
W. I. TUTTLE.
CHAIN CONSTRUCTION.
FILED MAY 12, 1921.
1,446,139.
2 SHEETS—SHEET 1.
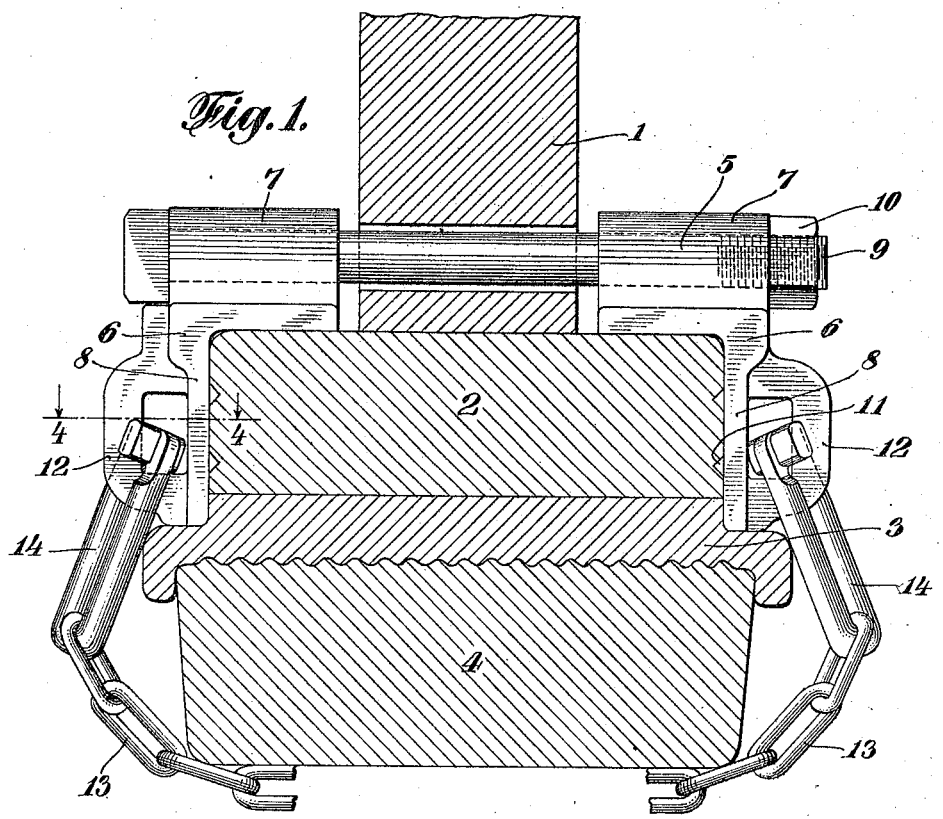
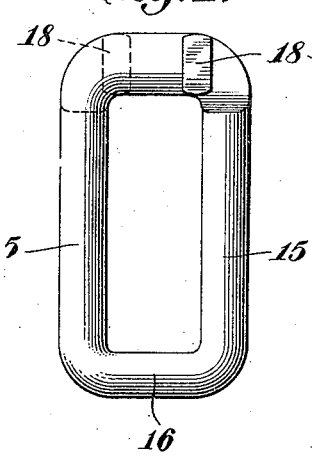
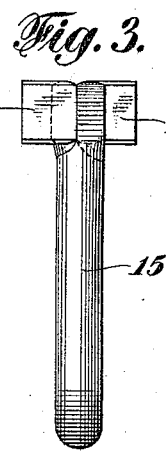
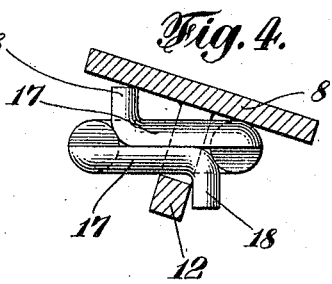
Walter I. Tuttle INVENTOR
BY
ATTORNEYS

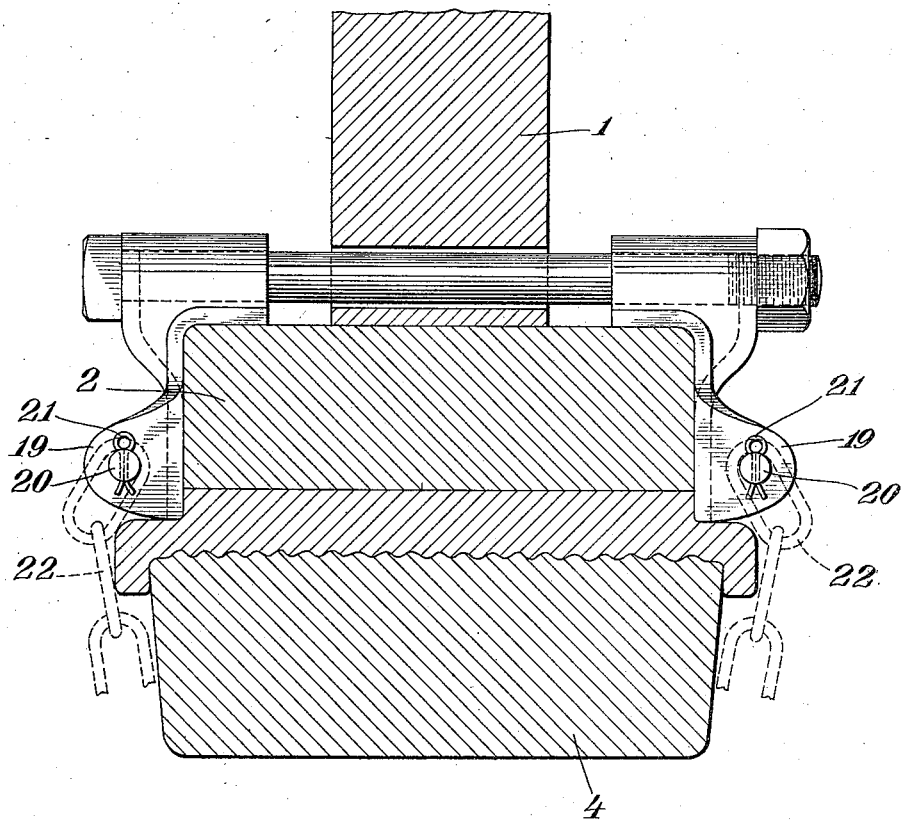

Patented Feb. 20, 1923.

1,446,139

UNITED STATES PATENT OFFICE.

WALTER I. TUTTLE, OF PROVIDENCE, RHODE ISLAND, ASSIGNOR TO FRANK MOSSBERG COMPANY, OF ATTLEBORO, MASSACHUSETTS, A CORPORATION OF RHODE ISLAND.

CHAIN CONSTRUCTION.

Application filed May 12, 1921. Serial No. 468,817.

*To all whom it may concern:*

Be it known that I, WALTER I. TUTTLE, a citizen of the United States, and a resident of Providence, in the county of Providence and State of Rhode Island, have invented an Improvement in Chain Constructions, of which the following is a specification.

This invention relates to chain construction and with regard to certain more specific features thereof to detachable links. One of the objects thereof is to provide a construction of the above nature which will be strong and durable and yet simple and inexpensive. Another object is to provide apparatus of the above nature in which the members are readily taken apart or assembled and yet securely held in assembled relation. Another object is to provide a detachable link of simple and practical construction and thoroughly efficient and dependable action. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

Referring now to the accompanying drawings in which is shown one of various possible embodiments of this invention, Figure 1 is a sectional elevation of the outer portion of a wheel with the chain apparatus mounted in position thereon;

Figure 2 is a plan of a link;

Figure 3 is an edge view of the link shown in Figure 2;

Figure 3ᵃ is a sectional view of a modified construction; and

Figure 4 is an end view of the same link, and related parts on the line 4—4 of Figure 1.

Similar reference characters refer to similar parts throughout the several views of the drawings.

Referring now to Figure 1 of the drawings, there is shown at 1 the spoke of a wheel which may be that of a motor vehicle and which terminates at its outer end with the felloe 2. Secured in any desired manner to this felloe is an outer rim member 3 between the flanges of which is mounted the tire 4.

Mounted upon the inner side of the wheel is a supporting device 5 and it may here be noted that by the term "inner" is meant a direction toward the hub of the wheel. The device 5 comprises a pair of substantially identical members 6, each of which has a sleeve portion 7 and a gripping portion 8. The sleeve portions 7 are adapted to be brought in alignment as shown in the drawings, and held together by the bolt 9 and nut 10. The outer or gripping parts comprise spurs 11 adapted to bite into the surface of the wheel and eyes 12 which extend in a direction away from the felloe 2.

Upon the tightening of the nut 10 it will be seen that the members 6 are drawn into interlocking relation with the felloe 2 and there are provided a pair of securely mounted eyes 12 to which the chain may be removably attached.

Referring now to what may be considered the chain proper, although in a sense the entire apparatus forms a chain device, it may be noted that there is provided a section of ordinary chain 13 which may be of the usual twisted link construction. This chain is detachably connected with the eyes 12 by links 14 as shown in Figure 1 of the drawings, these links which are substantially identical being disclosed more clearly in Figures 2 to 4 inclusive of the drawings.

Referring now to the latter figures, the links comprise side portions 15 connected by an integral end portion 16 provided with a pair of overlapping portions 17 at the opposite end. These overlapping portions are preferably flattened as shown with respect to the body of the link and are provided with oppositely directed ends 18 bent substantially at right angles thereto as best shown in Figure 4 of the drawings. The ends 18 are carried outwardly to such an extent that when the parts are in assembled relation as shown in Figure 1 of the drawings, they cannot approach a common plane and thus permit the link to be pulled open. One of these ends engages the part 12 and the other is jammed against the base of the part 8, and with the link held by the chain 13 in the position shown in Figure 1 the end portions 17 and 18 are thus locked against relative sliding movement. If however it is desired to remove the chain, the link 14 is simply swung up into a position substantially parallel with the bolt 9 either by removing the part 7 or otherwise, whereupon the flattened portions 17 and 18 may be sprung apart to permit them to pass out of interlocking relation with the eye 12. The parts may be reassembled in a similar manner.

In the construction shown in Figure 3ª, the wheel, rim and tire are the same as in the construction above described and the general arrangement of the supporting device with its cross bolt is also like that first described, except as hereinafter pointed out. The depending portions embracing the part 2 are each formed with a pair of ears 19 and are identical on opposite sides of the wheel. Through registering holes in these ears are passed headed pins 20, the unheaded ends of which are held in position by external cotter pins 21. These pins 20 serve to hold in position the end links of an ordinary tire chain 22.

By this construction the chain may be throughout of a uniform character and yet may readily be released by withdrawal of one of the cotter pins 21 and the corresponding holding pin 20.

It will thus be seen that in the action of the device when the chain is in position as shown in Figure 1 of the drawings, the link 14 is positively locked against separation from the eye 12, however severe the strain may be on the parts. If however it is desired to remove or replace a chain, this is readily accomplished as above set forth.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim as my invention:—

1. In chain construction, in combination, a wheel felloe, a device secured to said felloe, a cross chain having at its ends a pair of links, each of said links having overlapping end portions respectively adapted to be sprung apart to make detachable connection with the adjacent end of said device, and means associated with said links adapted to coact with said ends of said device to prevent relative sliding of said overlapping end portions.

2. In chain construction, in combination, a wheel, a device secured thereto and forming an eye, and a chain having a link provided with overlapping portions adapted to be sprung apart to permit the same to be inter-linked with said eye, each of said overlapping portions having abruptly bent ends tending to interlock with said eye and prevent relative sliding of said overlapping portions.

3. In chain construction, in combination, a wheel, a road-gripping member positioned transversely of the tread thereof, a link secured to each end of said road-gripping member, each of said links having at one end overlapping portions, each of said overlapping portions being provided with a bend abruptly turned with respect thereto, and means positioned on said wheel adapted to cooperate with said links to secure said road-gripping member in position and with said bent portions thereof to prevent relative sliding of said overlapping portions.

4. In chain construction, in combination, a wheel, a road-gripping member positioned transversely of the tread thereof, a link secured to each end of said road-gripping member, each of said links being provided with a pair of overlapping portions relatively flattened in cross-section with respect to the body of the link and each having an end turned in a direction transverse to the plane of the link, and means positioned upon said wheel forming a pair of eyes adapted to receive said links to secure said road-gripping member in position and to cooperate with said turned ends thereof to prevent relative sliding of said overlapping portions.

5. In chain construction, in combination, a wheel, a device secured thereto and forming an eye, and a chain having a link at one end thereof provided with a pair of overlapping portions adapted to be sprung apart to permit the same to be interlinked with said eye, said overlapping portions respectively terminating in abruptly bent ends spaced one from another at a distance less than that between the side portions of the link, said bent ends tending to interlock with said eye and prevent relative sliding of said overlapping portions.

In testimony whereof, I have signed my name to this specification this 3d day of May, 1921.

WALTER I. TUTTLE.